United States Patent [19]

Blaive et al.

[11] 4,253,695
[45] Mar. 3, 1981

[54] AUTOMATIC GRAPPLE

[75] Inventors: Daniel Blaive, Gif-sur-Yvette; Claude Lafosse, Le Plessis Robinson, both of France

[73] Assignee: Novatome, Le Plessis Robinson, France

[21] Appl. No.: 59,587

[22] Filed: Jul. 23, 1979

[51] Int. Cl.³ .............................................. B66C 1/54
[52] U.S. Cl. ................................. 294/95; 294/86 A; 294/86.25; 294/110 R
[58] Field of Search ............ 294/83 AA, 86 A, 86.17, 294/86.2, 86.21, 86.24–86.26, 86.29, 86.3, 86.33, 94, 95, 110 R, 116

[56] References Cited

U.S. PATENT DOCUMENTS 3,408,101  10/1968  Savary ............................... 294/95 X

FOREIGN PATENT DOCUMENTS 1334480  7/1963  France ................................. 294/86 A
1482974  6/1967  France ..................................... 294/94
920155  3/1963  United Kingdom .................... 294/116
1001652  8/1965  United Kingdom .................... 294/116
139064  12/1960  U.S.S.R. ................................. 294/116

Primary Examiner—Johnny D. Cherry
Attorney, Agent, or Firm—Haseltine and Lake

[57] ABSTRACT

An automatic grapple comprising a hollow body and a slide suspended by a maneuvering cable with axially spaced portions to transform the relative movement of the slide to a displacement of gripping arms for engaging an object to be seized. The slide carries a locking member having variable orientation modified in a lower position of the slide. The position of extension or retraction of the arms is controlled by the axially spaced portions which have different diameters. The relative position of these portions is determined to permit rotation of the locking member only if the arms can be engaged in the object to be seized or is totally disengaged therefrom.

11 Claims, 11 Drawing Figures

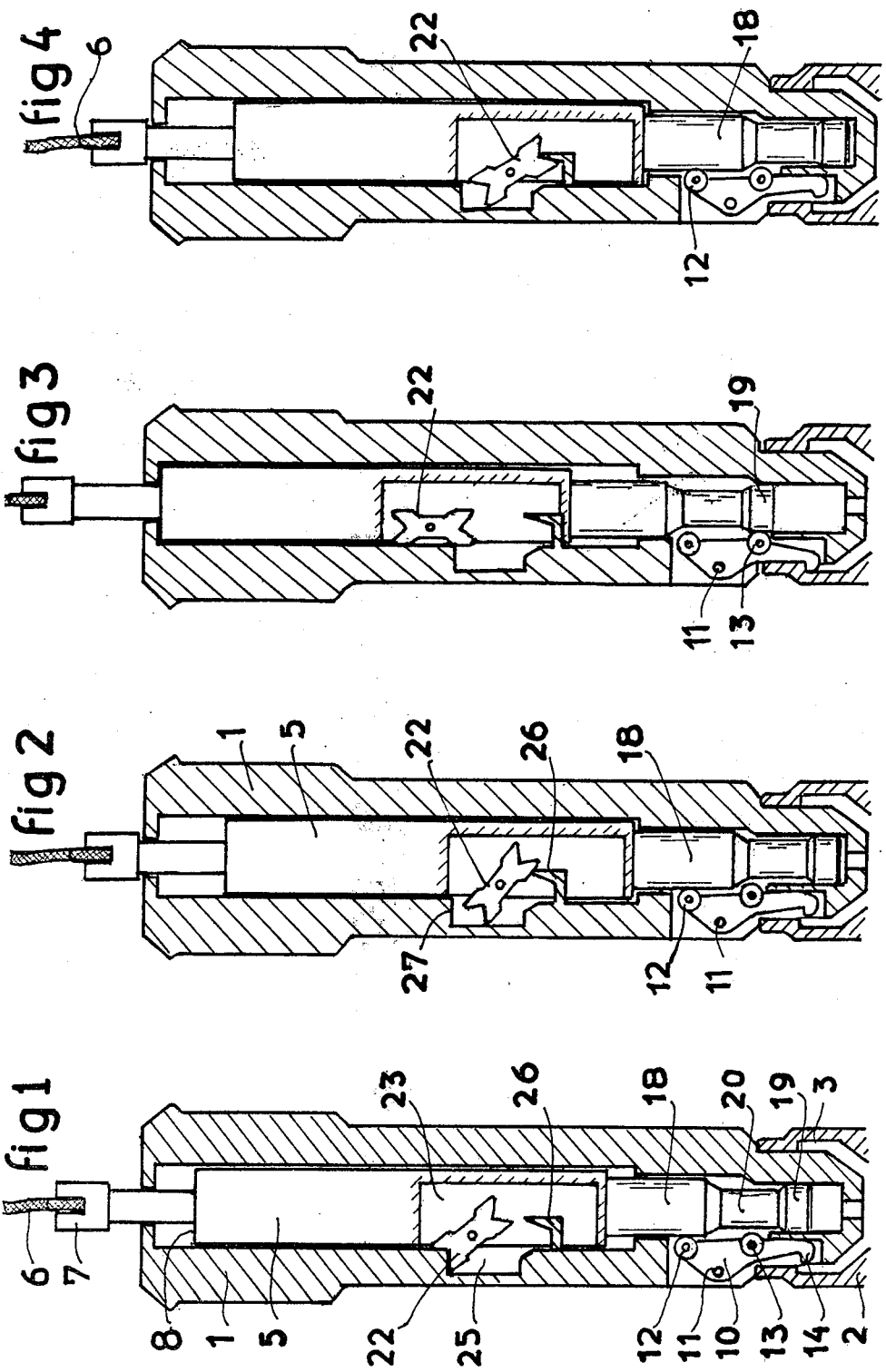

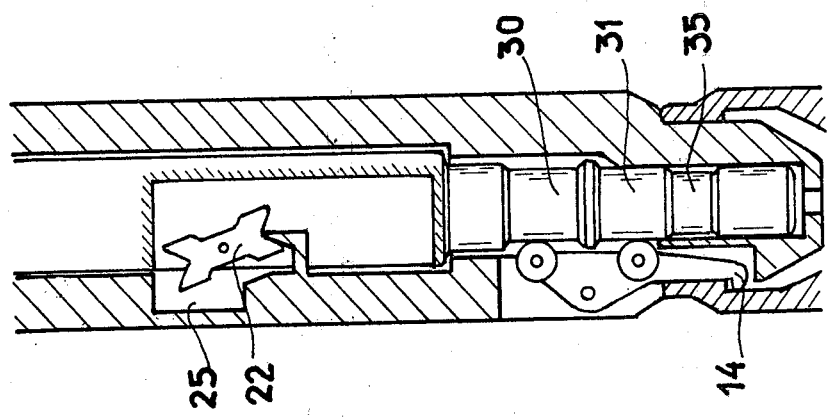
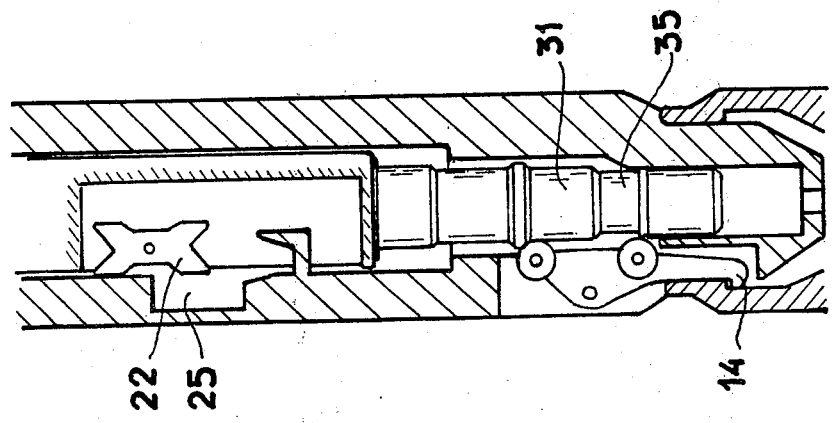
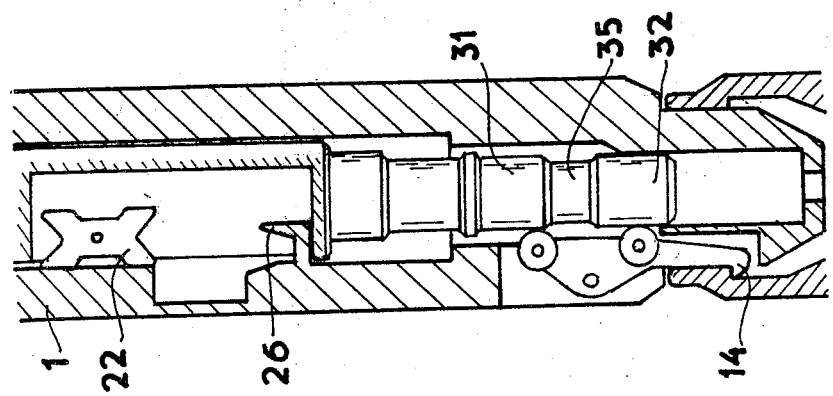

AUTOMATIC GRAPPLE

FIELD OF THE INVENTION

The present invention relates to an automatic grapple for handling of relatively inaccessible objects. It is applicable particularly, by way of example, to nuclear installations for the handling of combustible assemblies or various accessory devices in the core of the reactor of such installation.

PRIOR ART

There is known, particularly from French Pat. No. 1,482,974 and its addition French Pat. No. 92,909, an automatic mechanical grapple which permits such handling. The known automatic grapple comprises a hollow cylindrical body in which a slide can be displaced. The slide is fixed to a suspension cable such that when the body is free the slide suspended from the cable is in an upper position with respect to the body which then rests on a shoulder of the slide. If, in contrast, the body is supported, for example, on the object to be seized, the slide through gravity bears in a lower position on the body and it is therefore, the slide which rests on the body. The relative movement of the slide in the body when the assembly is raised or lowered is utilized to manipulate gripping arms articulated on the body of the grapple and which can thus occupy an expanded position or a retracted position for respectively engaging or releasing the object to be seized.

Such a grapple also comprises an intermediate locking system constituted by a member currently known as a "diabolo" articulated to the slide and whose orientation is modified when in lowered position of the slide it comes into abutment with a fixed finger secured to the body. In a front position in the cycle of operation, the locking member is in a release position allowing the unobstructed movement of the slide upwardly to its raised end position or a locking position where it prevents the upward movement of the slide in an intermediate position. The intermediate position corresponds to the retracted position of the gripping arms, i.e. for release of the object; the upper end position of the slide corresponds to the expanded position of the gripping arms, i.e. for engagement of the object. Thus, by simple manipulation of the winch of the suspension cable, the object can be seized or released.

The above cited patent discloses gripping arms provided with hooks associated with a groove in the object to be seized; however, the disclosed mechanism for the manipulation of the gripping arms from the movement of the slide leads to relatively substantial impact and to the risk of jamming, and the construction is not simple.

In addition, as frequently occurs in the reactors, particularly when using sodium, solid particles remain in the groove or throat of the assemblies to be seized. The engaging operation of the grapple may thus be improperly effected which can be dangerous in the subsequent handling. In the apparatus disclosed in French Pat. No. 1,482,974 there is nothing to prevent the lifting of the assembly even if the grapple is improperly engaged in the groove of the assembly which can lead to lifting an assembly with the risk of untimely release in the course of handling.

SUMMARY OF THE INVENTION

An object of the present invention is to provide an improvement in the construction in French Pat. No. 1,482,974 and its addition which includes an improved mechanism for operating the engaging gripping arms while providing safety of operation which prevents, for example, the engagement of the arms with the assembly to be seized if one or more arms are not totally engaged in the associated groove of the assembly to be seized.

The invention is applicable to an automatic grapple connected to a single cable for the suspension and manipulation and comprising:
  a hollow cylindrical body,
  a slide connected to the suspension cable and capable of displacement with respect to the hollow body between an upper end position where the hollow body is free from the object and supported by the slide and a lower end position where the body bears on the object and supports the slide,
  gripping means secured to the body for axial displacement therewith and radially displaceable between a gripping position in which the gripping means engages the object and a released position in which the gripping means is free from the object,
  means for producing radial displacement of the gripping means in response to relative movement of the slide in the body,
  locking means having variable orientation articulated on the slide for undergoing axial movement therewith, abutment means fixed to said body and disposed in the path of travel of said locking means for engaging said locking means in the lower position of the slide to orient the locking means to a release position allowing complete ascent of the slide to said upper end position, said locking means having a locking position prior to said release position in which ascent of the slide is limited to an intermediate position.

According to one preferred embodiment of the invention, the relative axial positions of the various portions of different diameter of the slide are determined such that from the intermediate lock position where the gripping means is in released position, the relative travel of the slide toward the bottom of body necessary to place the gripping means in gripping position is less than the necessary travel to permit change of orientation of the locking member to the release position permitting free ascent of the slide to said upper position.

According to another preferred embodiment of the invention, the relative axial positions of the various portions of different diameter of the slide are determined such that from said upper end position of the slide in which the locking means is in released position and the gripping means in gripping position, the travel of said slide towards said lower end position to effect release of said gripping means is less than the travel necessary to change the orientation of the locking means to the position which prevents free upward travel of the slide whereby if said gripping means fails to assume the gripping position the slide will ascend with the object engaged by the gripping means.

BRIEF DESCRIPTION OF THE DRAWINGS

The invention will be better understood with reference to a particular embodiment given, by way of example, and illustrated in the attached drawings.

FIG. 1 is a diagrammatic sectional view showing the grapple of the invention in a first stage of operation in released position when it is just placed into contact with the object to be seized.

FIG. 2 shows the grapple in a second stage in which the suspension cable is in a position of maximum relaxation.

FIG. 3 shows the grapple in a third stage in which it is engaged with the object to lift the same.

FIG. 4 shows the grapple in a fourth stage in which the object is released.

FIGS. 5–10 show, on enlarged scale, a portion of a modification of the grapple of FIGS. 1–4, FIGS. 5, 7, 8 and 10 illustrating respective stages corresponding to those of FIGS. 1, 2, 3 and 4.

FIG. 6 shows a intermediate state in the engaging stage.

FIG. 9 shows an intermediate state in the releasing stage.

DETAILED DESCRIPTION

Figure 5:
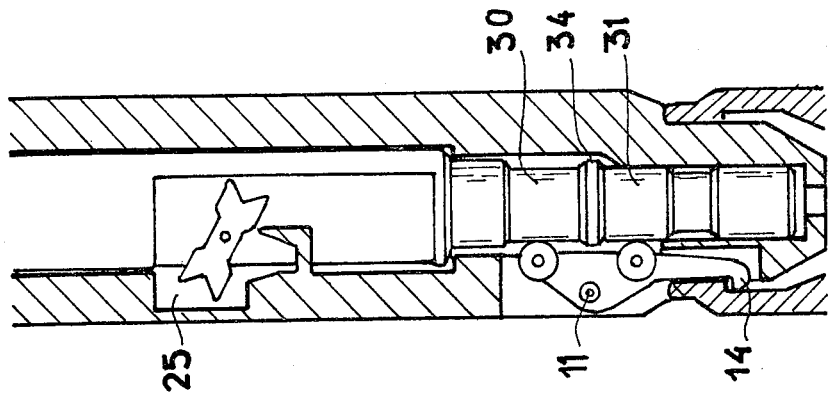

Referring first to FIGS. 1–4, therein is seen a grapple comprising a hollow cylindrical body 1 whose lower portion has a shape adapted to the shape of the upper portion of an object 2 to be handled and, for example, in the particular embodiment, the object 2 is a combustible assembly for a nuclear reactor. The object or assembly 2 is provided with an internal groove 3 which is engaged by the grapple to lift the object with the grapple in a manner to be fully explained later. The grapple comprises an axial slide 5 and a cable 6 for suspension and maneuvering of the grapple. A cap 7 is secured to a rod of the slide 5 and is disposed outside of the body of the grapple to engage cable 6. The travel of the slide 5 in the body of the grapple is limited, on the one hand, by the shoulder 8 of the slide which can abut against the inner surface of the upper portion of the body 1 and, on the other hand, by the cap 7 which can abut against the body of the grapple.

The grapple further comprises gripping arms 10 also distributed around the grapple and only one of which has been illustrated in order to simplify the drawing. Each arm 10 is articulated at 11 to the body 1 and supports two spaced rollers 12 and 13. The extremity of the lever constituting the arm comprises a hook 14 of a shape correlated with that of the groove 3 of the assembly to be seized.

The lower part of the slide 5 comprises two cylindrical portions 18 and 19 separated by a cylindrical portion 20 of smaller diameter. Conical connecting portions join the different cylindrical portions. A pivotal locking member 22 or "diabolo" is connected to the slide for pivotal movement in the interior of a chamber 23 in the slide. The extremities of the locking member 22 each have a square notch. Additionally, the body 1 of the grapple has a lateral chamber 25 situated substantially in facing relation with the chamber 23 in the slide. Beneath the chamber 25 is a fixed finger or abutment 26 projecting inwardly and extending into the chamber 23 in the slide.

The operation of the apparatus is similar to that which has been disclosed in relation to French Pat. No. 1,482,974 and is now going to be briefly set forth.

In FIG. 1 the relative disposition of the various members of the grapple is that which corresponds to the open handling of the grapple. In this case, the locking member 22 is held substantially at an angle of 45°. In this regard, under the effect of gravity, the body 1 comes to rest in the notch at the extremity of the locking member by means of the shoulder 27 forming the upper surface of the chamber 25. In this position, the roller 12 is displaced outwardly by the cylindrical portion 18 whereas the roller 13 is situated in facing relation with the portion 20 of reduced diameter whereby the hooks 14 of the arms 10 are retracted inwardly without projecting beyond the body 1.

It is in this state that the grapple is lowered onto the assembly 2 to be seized. From the position shown in FIG. 1 where the grapple has just come into contact with the assembly 2, the cable 6 is allowed to descend and slacken, and while the body 1 is prevented from lowering by the assembly 2 the slide 5 continues to descend in the interior of the body to an end position shown in FIG. 2. In this new position, the roller 12 still bears on the portion 18 and the gripping arms remain retracted. However, the locking member 22 is now in contact with the abutment 26 which has slightly rotated the locking member in counter-clockwise direction.

In this condition if the cable 6 is pulled, the slide 5 will progressively retake the position in the body corresponding to FIG. 1, but the notch in the locking member 22 is no longer going to enter into contact with the surface 27, but rather will engage surface 27 with a portion of its exterior surface which will produce a rotation of the locking member through an angle greater than 90° to the position shown in FIG. 3. In the position in FIG. 3, the locking member 22 does not constitute an obstacle to the ascent of the slide 5 and the slide will be raised to a position in abutment at the upper portion of the body 1. If the cable is continued to be pulled, the assembly of the slide 5 and body 1 will be then raised. However, it is seen that in this position as shown in FIG. 3 the roller 12 has been released from the cylindrical portion 18 whereas the roller 13 is urged outwardly by the portion 19 which produces rotation of the gripping arm whose hook 14 projects outwardly and engages in the groove 3 of the assembly 2. By raising the slide by the cable, the body 1 and the assembly 2 are thereby both raised, the assembly 2 being now engaged.

The assembly 2 can now be transported with the grapple to a location at which the assembly is to be released and for this purpose the grapple is lowered to rest the assembly 2 on a support whereupon continued lowering of the cable results in lowering of the slide 5 to the lowered end position shown in FIG. 4. During this descent, the position of FIG. 2 is passed and the roller 12 is urged outwardly and the roller 13 released to return towards the axis of the grapple. This results in the retraction of the arms 14 and disengagement between the grapple and the assembly 2. In the position in FIG. 4, the locking member 22 is again in abutment with the fixed finger 26, but in view of the vertical orientation which it had assumed its lower notch comes into abutment with the finger 26. Consequently, there is a pivotable movement and orientation of the locking member 22 such that the other notch directly faces the shoulder 27 of the body. When the cable is raised, the locking member 22 comes into engagement with the shoulder 27 thereby preventing further ascent of the slide 5 in the body. In this position, the arms 14 are retracted whereby if the pull on the cable 6 is continued only, the slide and the body 1, which is engaged on the locking member 22, will be raised whereas the released assembly 2 will remain in place.

Notable is the simplicity of the construction of the mechanism which transforms the relative movement of the slide 5 in the body 1 to a movement of opening and closing of the gripping arms 10 which assures high safety of operation of the arms in service.

Reference will next be made to FIGS. 5 to 10 showing a variation which provides safety in operation in the case where solid particles become accumulated in the groove 3 in the assembly 2 which would interfere with the free travel of the gripping arms in both directions. The variation essentially resides in the arrangement of the cylindrical surfaces constituting the lower portion of the slide. All of the other elements, such as the end abutments of the slide 5 in the body 1 or the operation of the intermediary locking member 22 are identical to those as just described.

In FIG. 5, the lower part of the slide comprises three portions 30, 31 and 32 of the same diameter. The portions 30 and 31 are separated by a portion of larger diameter of relatively short length 34 whereas the portions 31 and 32 are separated by portion 34 of smaller diameter. All of the portions of different diameter are connected by conical portions. The projection of portion 34 is substantially equal to the difference in the radii between portion 35 and portions 30, 31 and 32 and the portions 34 and 35 are spaced from one another at a distance equal to the spacing between the axes of the rollers 12 and 13, such that when the roller 12 is engaged by the projection 34, the roller 13 faces portion 35 and the rollers undergo a displacement of the same amplitude in opposite direction. The rollers 12 and 13 have their axes at the same distance from the pivot axis 11 of the gripping arm 10.

The expanded position of the arms, i.e. for engagement of the hook 14 in the groove 3 is obtained when rollers 12 and 13 bear against the portions 30, 31 and 32 of the same diameter. The retracted position of the arms i.e. of disengagement of the hooks from the groove 3 is obtained when the roller 12 is engaged by the projection 34 while the roller 13 bears against the portion 35 of reduced diameter.

Figure 6:
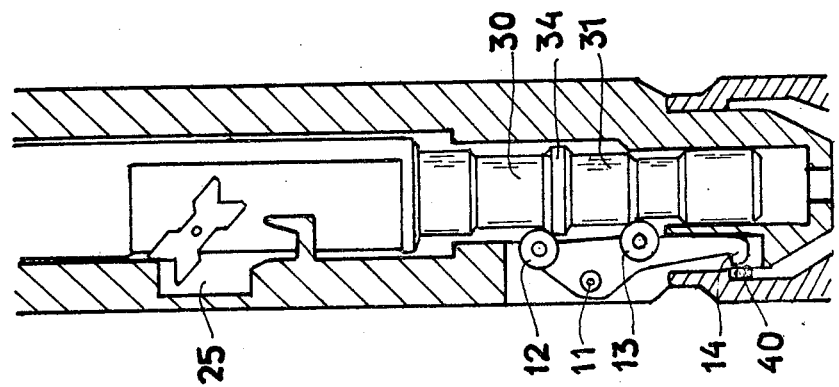
Figure 7:
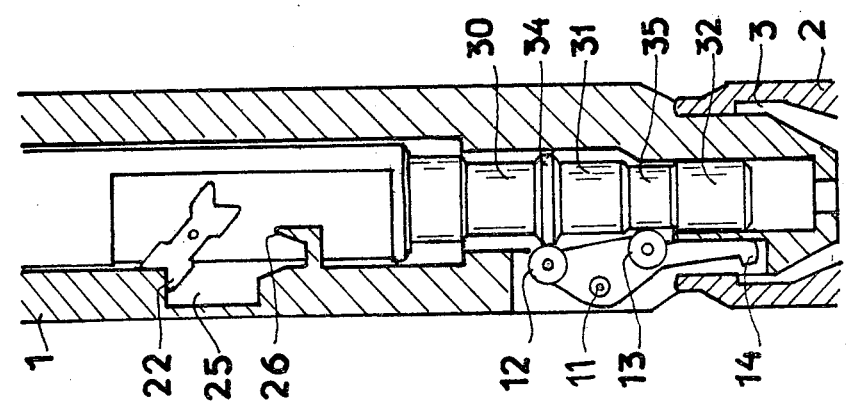

If one proceeds from the position shown in FIG. 5, similar to FIG. 1 previously described and which corresponds to the instant where the free grapple has descended towards the assembly 2 and first comes into contact therewith, it is seen that, as in FIG. 1, the arms are in retracted position to permit the entry of the lower portion of the grapple into the upper portion of the assembly 2. However, in the modification, after arresting of the body of the grapple and when the slide 5 begins its descent in the interior of the body 1 there is an immediate movement of expansion of the arms as the portion 31 comes into engagement with the roller 13 while the roller 12 tends to be released by the projection 34. If, as shown in FIG. 6, solid particles 40 have become accummulated in the groove 3 of the assembly 2 thus interfering with normal engagement of the hooks 14, the slide can not continue to descend since the roller 13 can not travel sufficiently to allow passage to the surface 31. The slide therefore can only descend a small amount corresponding to the take-up of play while the locking member 22 can not descend to the position in which it can contact abutment 26 and, in fact, the surface 27 does not leave the notch at the end of the locking member. In this position if the cable is pulled to raise the assembly, the locking member 22 will remain in its locked position blocked by the surface 27; the arms 10 will remain in their retracted position and the raising of the grapple will not lead to raising of the assembly 2. This constitutes a fundamental safety measure as it is considered necessary not to raise the assembly 2 when such ascent with an uncertain engagement could lead to an untimely release in the course of subsequent manipulation with all of the risks attendant thereto.

If in constrast, nothing opposes the correct introduction of the hooks 14 into the groove 3, the lower end position of the slide will be achieved (FIG. 7) with partial rotation of the locking member 22 by abutment with the finger 26, thus, leading to the complete ascent of the slide to the position as shown in FIG. 8 which is that of complete raising of the grapple and object with the gripping hooks of the arms completely engaged in the groove 3 of the object 2.

It is seen that the apparatus thus constructed permits, without supplemental movement of the cable, verification of the locking of the hooks in the groove before freeing the locking member 22 and permitting pivotal movement thereof. Thus, if the engagement of the hooks is not complete an empty lifting of the grapple is produced. Thereby, when the object is lifted there is absolute assurance of positive locking of the grapple with the assembly 2.

This improvement is also useful in the reverse stage of placing an assembly 2 on a support in the case where the hooks would remain partially engaged in the groove due to the presence of particles. Reference in this regard is made to FIG. 9 which shows the first stage of the descent of the slide in the body after the combination of the assembly 2 and the body has taken a seated position. Here also the projection 34 will engage the roller 12 to initiate the opening of the arms before the locking member 22 has come into contact with the finger 26 which would lead to its change of orientation and also before the upper portion can pivot in the chamber 25. If the opening of the arms can not be effected, for example, because of a collection of material in the groove 3 preventing movement of the arms, the slide 15 cannot descend below the position shown in FIG. 9 and the locking member 22 will remain in vertical position. When the suspension cable is pulled the slide can ascend to the upper end position with the arms remaining in engaged position; the ascent will not only lead to lifting of the grapple, but also to the lifting of the defective assembly 2 which can thereafter be cleaned before a new operation is effected.

If, in contrast, nothing opposes the normal operation of opening of the gripping arms, the rollers 12 and 13 will be displaced under the action of the projection 34 and the portion 35 and the slide can descend to the lower end position as shown in FIG. 10, similar to FIG. 4 of the previous embodiment, which will lead to a rotation of the locking member 22 to the position of FIG. 10. A new pull on the cable will correspond to a partial ascent of the slide 5, which will come into abutment in the intermediate position, when the locking member 22 retakes the position shown in FIG. 5. In this position, the arms will be in retracted position and the following stage will be a lifting of the grapple completely released from the assembly 2 which will thus remain in place.

Of course, the invention is not strictly limited to the embodiments which have been described by way of example, but they also cover embodiments which are distinguished only in details, in variations of construction, or by the utilization of equivalent means.

Figure 11:
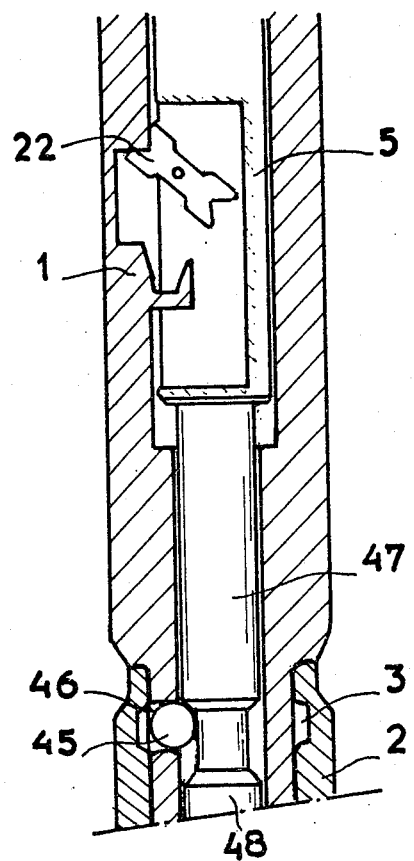
FIG. 11 shows a modified embodiment having a ball member.

Thus, the articulated arms could be replaced by simple balls of diameter greater than the thickness of the walls of the body 1 and partially engaged in recesses in the body. FIG. 11 shows such variation in a position corresponding to FIG. 5 of the previous embodiment, namely, at the instant where the body 1 of the grapple is freed from contact with the assembly 2 to be seized. It is seen here, as in FIG. 5, that the complete descent of the slide 5 can be effected only if the groove 3 is not clogged which would prevent the ball 45 from entering the groove after being radially displaced in the recess 46 under the action of the cylindrical surface 47 of the slide. If this displacement is prevented, the ball will not permit descent of the slide sufficient to free the locking member 22 and the slide will remain in abutment in intermediate position and the balls, constituting the gripping members, will remain in retracted position. If, in contrast, the radial displacement of the balls is not opposed, the slide will descend to the bottom, the locking member 22 will pivot to a position which will then allow complete raising of the slide. In this latter position for lifting and locking, the balls 45 are maintained by the surface 48 partially in the groove 3 and partially in the recess 46 to effect locking of the grapple with the assembly 2.

The illustration in FIG. 11 has been simplified and therein has not been shown the means for partially retaining the balls 45 which permits their radial displacement for locking, but prevents them from escaping from the body 1 when only the grapple is raised.

This simpler variation permits clear verification of proper engagement before lifting. It suffices, as in the previous example, that the relative axial positions of the various portions of different diameter of the slide are determined such that from the intermediate position, the travel of the slide towards the bottom necessary to engage the balls at the bottom of the groove is less than the travel necessary to permit a change of orientation of the locking member 22.

In contrast, this variation does not permit, in the reverse manipulation of release, of determining that the balls are freely disengaged from the groove.

What is claimed is:

1. In an automatic grapple for seizing or releasing an object by means of a single suspension and maneuvering cable and comprising:

a hollow cylindrical body, a slide connected to the suspension cable and capable of displacement with respect to the hollow body between an upper end position where the hollow body does not bear on the object and is supported by the slide and a lower end position where the body bears on the object and supports the slide, gripping means secured to the body for axial displacement therewith radially displaceable between a gripping position in which the gripping means engages the object and a released position in which the gripping means is free from the object, means for producing radial displacement of the gripping means in response to relative movement of the slide in the body, a locking member having variable orientation articulated on the slide for undergoing axial movement therewith, abutment means fixed to said body and disposed in the path of travel of said locking member for engaging said locking member in the lower position of the slide to orient the locking member to a release position allowing complete ascent of the slide to said upper end position, said locking member having a locking position prior to said release position in which ascent of the slide is limited to an intermediate position, the improvement wherein said means for producing radial displacement of the gripping means comprises portions of different diameters on said slide in the region where said slide passes adjacent said gripping means, said gripping means bearing against said portions to establish said gripping position when the slide is at said upper end position and said released position when said slide is in said intermediate position, said portions of different diameter having relative axial positions on said slide such that from the intermediate locking position in which the gripping means is in released position, relative travel of the slide towards the lower end position for placing the gripping means in gripping position is less than the necessary travel to permit change of orientation of the locking member to the release position permitting free ascent of the slide to said upper position.

2. The improvement as claimed in claim 1 wherein said locking member comprises a pivotal locking bar engageable with said body in a locking position to prevent raising of said slide, said slide being lowerable to said lower end position to cause said abutment means to pivot said locking bar to said release position, said portions of different diameter producing release of said gripping means before said locking bar contacts said abutment means.

3. The improvement as claimed in claim 2 wherein said gripping means comprises pivotal gripping arms and rollers on said arms in contact with said portions of different diameter.

4. The improvement as claimed in claim 3 wherein two rollers are provided on each arm, one roller being in contact with a larger diameter portion and the other roller faces a smaller diameter portion.

5. The improvement as claimed in claim 2 wherein said gripping means comprises balls retained in part in recesses provided in said body.

6. The improvement as claimed in claim 2 wherein said portions of different diameter include two portions of same diameter separated axially by a portion of reduced diameter.

7. The improvement as claimed in claim 1 wherein said portions of different diameter are dimensioned to prevent lowered movement of said slide beyond said intermediate position if said gripping means is not brought to said gripping position.

8. The improvement as claimed in claim 1 wherein said portions of different diameter are dimensioned such that from said upper end position of the slide in which the locking member is in released position and the gripping means in gripping position, the travel of said slide towards said lower end position to effect release of said gripping means is less than the travel necessary to change the orientation of the locking member to the position which prevents free upward travel of the slide whereby if said gripping means fails to assume the release position the slide will ascend with the object engaged by the gripping means.

9. The improvement as claimed in claim 8 wherein said portions of different diameter include a projection portion and a reduced diameter portion in axially spaced relation.

10. The improvement as claimed in claim 9 wherein said portions of different diameter further include first and second portions of the same diameter separated by said projection portion which is of large diameter, and a third portion of the same diameter as said first and second portions and separated from the second portion by said reduced diameter portion.

11. The improvement as claimed in claim 10 wherein said gripping means comprises pivotal gripping arms and a pair of spaced rollers on each arm, the spacing between said rollers being equal to the spacing between said projection portion and said reduced diameter portion.

* * * * *